(12) United States Patent
Schmid et al.

(10) Patent No.: US 6,328,065 B1
(45) Date of Patent: Dec. 11, 2001

(54) ELECTROMAGNETIC HYDRAULIC VALVE

(75) Inventors: Werner Schmid, Tamm; Raymond Schuurman, Schwieberdingen; Christof Ott, Asperg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,923

(22) PCT Filed: Jul. 25, 1998

(86) PCT No.: PCT/DE98/02098

§ 371 Date: Sep. 9, 1999

§ 102(e) Date: Sep. 9, 1999

(87) PCT Pub. No.: WO99/08169

PCT Pub. Date: Feb. 18, 1999

(30) Foreign Application Priority Data

Aug. 4, 1997 (DE) ............................................... 197 33 660

(51) Int. Cl.[7] ................................................. F15B 13/044
(52) U.S. Cl. ................................. 137/596.17; 251/129.14
(58) Field of Search ................... 137/596.17; 251/129.14

(56) References Cited

U.S. PATENT DOCUMENTS

| | | | |
|---|---|---|---|
| 2,868,494 | * 1/1959 | Kearns et al. | 251/129.14 X |
| 4,312,380 | * 1/1982 | Leiber et al. | 137/596.17 X |
| 4,338,966 | * 7/1982 | Smith | 137/596.17 |
| 4,998,559 | * 3/1991 | McAuliffe | 137/596.17 |
| 5,076,323 | * 12/1991 | Schudt | 137/596.17 |
| 5,104,091 | * 4/1992 | Rathay et al. | 137/129.14 |
| 5,135,027 | * 8/1992 | Miki et al. | 137/596.17 |
| 5,606,992 | * 3/1997 | Erickson et al. | 137/596.17 |
| 5,651,391 | * 7/1997 | Connolly et al. | 137/596.17 X |

FOREIGN PATENT DOCUMENTS 43 42 591 A1    6/1995 (DE) .

* cited by examiner

*Primary Examiner*—Gerald A. Michalsky
(74) *Attorney, Agent, or Firm*—Michael J. Striker

(57) ABSTRACT

In a proposed electromagnetic pressure regulating valve (10, 10*a*), the functional characteristics of a pressure regulating valve are combined with those of a switching valve. The pressure regulating valve (10, 10*a*) can be used in particular to control automatic transmissions in motor vehicles and is characterized by reduced manufacturing costs, reduced leakage and an operating range which is expanded for reduced operating pressures and with a continuous characteristic line. For this purpose, the valve part (11, 11*a*) of the pressure regulating valve (10, 10*a*) has a first seat valve (45) with a closing element (34). This closing element (34) cooperates with an actuating element (35, 35*a*) which has a control edge (50) to form a second seat valve (49).

8 Claims, 2 Drawing Sheets

//ELECTROMAGNETIC HYDRAULIC VALVE

BACKGROUND OF THE INVENTION

The invention is based on an electromagnetic pressure regulating valve. A pressure regulating valve of this type is already known, for example, from DE 43 42 591 A1. This pressure regulating valve has, in its housing, a valve slide which is guided so as to be movable and whose position can be adjusted electromagnetically. The instantaneous regulating position of the valve slide can constantly be changed by a corresponding supply of current to its magnetic coil. In order for the pressure regulating valve to function properly in accordance with its application, great precision is required in the manufacture of the valve slide and slide guidance. The latter is a crucial factor in the tightness of the pressure regulating valve and its manufacturing cost. In addition, the valve slide requires a relatively high actuating force due to its relatively large effective pressure surfaces.

Further, DE 43 37 763 A1 discloses a valve which is referred to as a pressure regulating valve but which, in contrast to the subject matter of the invention, acts as a switching valve, its valve part being outfitted with two seat valves. One of the valve elements of the two seat valves is shaped conically and therefore necessitates a precise concentric arrangement with respect to its valve seat, which is expensive to carry out. In contrast to the subject matter of the invention, this known valve can be switched to three defined switching positions and is therefore incapable of generating at the consumer a continuous pressure regulating characteristic dependent on the current flowing to the magnet coil.

SUMMARY OF THE INVENTION

It is an object of the present invention to provide an electromagnetic pressure control valve which avoids the disadvantages of the prior art.

In keeping with these objects, the valve part of the valve has a first seat valve with a closing element and an actuating element which is switched between the armature and the closing element, and the actuating element penetrates a control borehole of the valve part and has a control edge which forms a second seat valve in cooperation with the control borehole.

In contrast to the prior art, the electromagnetic pressure regulating valve according to the invention has the advantage that it ensures a relatively high degree of tightness, especially in its end positions, with reduced requirements for the precision of its individual structural component parts. Accordingly, functional characteristics, including unwanted leakage, can be improved while reducing production costs. This is achieved by means of constructing the valve elements in a seat type construction, which has the further advantage that the pressure regulating valve has a relatively low sensitivity to coaxial deviations and to blocking due to particles of dirt from the pressure medium. The operating range of the pressure regulating valve is expanded with respect to low pressures, has a continuous pressure regulating characteristic and requires relatively small magnetic actuating forces.

The surface ratio of less than 0.3 between the hydraulically active surfaces of the two seat valves makes it possible for the closing force of the second seat valve facing the magnet part to be greater than the opening force of the first seat valve remote of the magnet part. Therefore, the pressure regulated at the consumer, whose pressure force on the valve slide is in equilibrium with the force of the magnetic circuit, depends decisively on the precision of the first valve seat. The second seat valve can be constructed with reduced precision for cost reasons. Moreover, the bore hole of the second seat valve already assumes its full throttling function at small portions of the total lift of the valve element. This depends substantially on the manufacturing tolerances of the bore hole and not on the opening lift. Bore holes with exacting tolerances can be produced in an economical manner. Accordingly, the regulating pressure of the pressure regulating valve can be adjusted at low cost in a particularly accurate manner up to the very low pressure ranges. Flat seat valves are characterized in particular by good sealing properties while requirements for the concentric arrangement of the valve element with respect to the valve seat are relatively relaxed at the same time.

BRIEF DESCRIPTION OF THE DRAWING

Two embodiment examples of the invention are shown in the drawing and described more fully in the following description.

DESCRIPTION OF THE PREFERRED EXAMPLES

Figure 1:
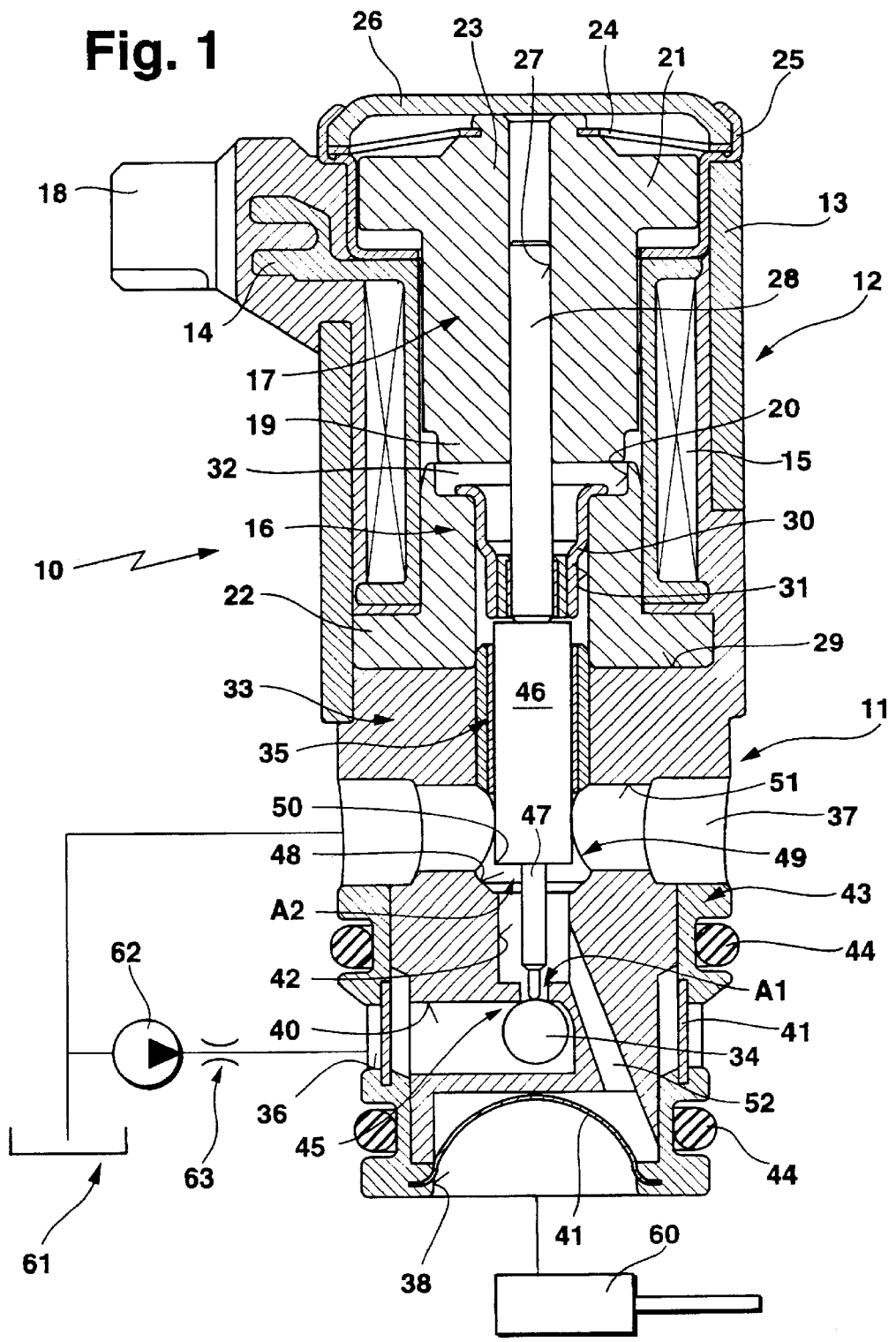
FIG. 1 shows a first embodiment example in longitudinal section; a second embodiment example is shown in FIG. 2, also in longitudinal section.

The first embodiment example of an electromagnetic pressure regulating valve 10 shown in FIG. 1 comprises a valve part 11 and a magnet part 12 which is arranged coaxial thereto. The magnet part 12 is enclosed by a sleeve-shaped housing 13 and is formed by a coil 15 which is wound on a coil body 14, a coil core 16 which projects into the interior of the coil 15, and an armature 17 which is movably guided in the coil body 14. The coil body 14 is a structural component part which is enclosed by plastic injection molding after the winding of the coil 15 in order to form a connector housing 18, among other purposes. The coil 15 is supplied with voltage by means of contact pins and lines, not shown in the drawings, which are injection-molded in the connector housing 18. The coil core 16 is positioned at the first end of the coil 15 facing the valve part 11, while the armature 17 is located at the opposite, second end of the coil 15. To form a plunger stage of the magnet part 12, the armature 17 has, at its end side facing the coil core 16, a projection 19 with reduced outer diameter. This projection 19 is adapted to a shaped portion 20 of the coil core 16, so that the armature 17 can penetrate at least partially into the coil core 16. Further, the coil core 16 and the armature 17 are constructed so as to be substantially cylindrical, each having a neck or shoulder 21, 22 overlapping the front side of the coil 15. With respect to the armature 17, the shoulder 21 is adjoined in the axial direction by a frustum-shaped continuation 23 to which is fastened a diaphragm spring 24 serving as a bearing for the armature 17. This diaphragm spring 24 projects over the armature 17 on the circumferential side and is supported by its outer edge on a contact surface of a holding element 25 which is centered at the coil body 14. The holding element 25 has a collar extending along the circumference which is flanged so as to fix the position of a cover 26 which closes the pressure regulating valve 10 outwardly.

The armature 17 has a continuous receiving bore hole 27 along its longitudinal axis, wherein an adjusting piston 28 is pressed partially into the receiving bore hole 27. The adjusting piston 28 extends beyond the end of the armature 17 on the coil core side and is guided at the free end by a guide sleeve 30. This guide sleeve 30 is inserted into a recess 31 of the coil core 16 extending coaxial to the receiving bore hole 27 of the armature 17.

There is a work gap 32 in the axial direction between the armature 17 and the coil core 16.

In the neutral position of the magnet part 12 in which no current is supplied, the free end of the adjusting piston 28 terminates flush with the end face of the guide sleeve 30 facing the valve part 11, wherein this guide sleeve 30 is offset relative to a flange surface 29 formed for the valve part 11 by the coil core 16. This valve part 11 is connected with the magnet part 12 and represents the hydraulic part of the pressure regulating valve 10. The valve part 11 is formed of a connection piece 33, a closing element 34 and an actuating element 35. The connection piece 33 has an inlet 36, a return 37 and a consumer channel 38. The inlet channel 36 is constructed as an annular channel at the circumference which is arranged on the side of the valve part 11 remote of the magnet part 12. The annular channel of the inlet 36 continues into a side-cut or branch channel 40 which is guided radial to the longitudinal axis of the pressure regulating valve 10. This branch channel 40 is constructed as a blind hole and terminates in the area just behind the longitudinal axis of the pressure regulating valve 10, where it meets with a control bore hole 42 which extends centrally in the connection piece 33 and ends in this location. This control bore hole 42 is aligned with the recess 31 of the magnet part 12. In order to keep dirt away from the interior of the pressure regulating valve 10, a cup-shaped filter cage 43 is arranged on the valve part 11, wherein a partially exposed filter fabric 41 is injection-molded in the filter cage 43. The inlet 36 is sealed by conventional sealing rings 44 which are inserted above and below the inlet 36 in the longitudinal direction in grooves which are provided in the filter cage 43 for this purpose.

The closing element 34 of the valve part 11, which closing element 34 is constructed in a spherical shape, is located at the inner end of the blind-hole branch channel 40. This closing element 34 is pressed on a valve seat by the pressure in the inlet 36 and, in doing so, acts as a first seat valve 45 on the inlet side. The first seat valve 45 is constructed at the location where the control bore hole 42 opens into the branch channel 40. Pressure medium is prevented from flowing from the inlet 36 to the control bore hole 42 in the neutral state of the seat valve 45 shown in the drawing. The closing element 34 is in a working connection with an actuating element 35 which is movably guided in the end portion of the control bore hole 42 facing the magnet part 12 and is sealed toward the magnet part 12. The actuating element 35 has a shaft 46 followed by a tappet 47 in the direction of the valve part 11. This tappet 47 contacts the closing element 34 by its front end without force in the currentless state of the magnet part 12. A transition from the shaft 46 to the tappet 47 which is formed by a right angle, for example, forms a control edge 50 at the actuating element 35. This control edge 50 is situated roughly at the height of a transverse bore hole 51 which penetrates the valve part 11 and its control bore hole 42 in the radial direction. The transverse bore hole 51 terminates in an annular channel forming the return 37. A concentric reduced portion 48 having a greater outer diameter than the control bore hole 42 is formed at the intersection between the control bore hole 42 and the transverse bore hole 51 on the side of the control bore hole 42 facing the inlet 36. Along with the control edge 50, this reduced portion 48 forms a second valve seat 49 on the return-flow side, which second valve seat 49 is open in the neutral state of the magnet part 12 shown in the drawing. In this state, the control edge 50 cooperates with the walls of the transverse bore hole 51, the reduced portion 48 and the control bore hole 42 as a throttle which regulates the pressure level at the consumer connection 38. For this purpose, the consumer channel 38 is connected with the control bore hole 42 by a bypass 52 to the closing element 34. The consumer channel 38 is arranged at the front end of the pressure regulating valve 10 opposite the magnet part 12 and is protected from impurities by the filter fabric 41 of the filter cage 43.

The functioning of the pressure regulating valve according to the invention will be explained by considering the currentless neutral state of the magnetic circuit 12 separately from the state in which it is supplied with current.

As was already described, the closing element 34 is located on its valve seat in the currentless neutral state and accordingly blocks the flow of pressure medium through the inlet 36. In this state, there is a direct connection, via the bypass 52, between the consumer channel 38 and the return 37, so that pressure medium can flow from a consumer 60 connected to the consumer channel 38 to a tank 61 connected with the return 37. In this case, the control edge 50 is located in a position in which it does not exert a throttling function, so that the return 37 pressure prevails at the consumer channel 38.

In contrast, the closing element 34 is moved into its open position when the coil 15 is supplied with current as a result of the deflecting movement of the armature 17 and actuating element 35. Pressure medium therefore flows from a pressure generator 62 connected with the inlet 36 into the control bore hole 42 and is divided into a partial flow to the consumer channel 38 and a partial flow to the return 37. In so doing, the control edge 50 of the actuating element 35 has approached the valve seat of the second seat valve 49, so that the control edge 50 throttles the partial flow from the inlet 36 to the return 37.

Operating states in which the pressure in the consumer channel 38 is less than that of the inlet 36 can be regulated by a throttle 63 which is arranged subsequent to the pressure generator 62 connected with the inlet 36. The magnitude of the deflecting movement imparted to the armature 17 and therefore to the actuating element 35 can be changed electrically by the level of current flowing to the magnet coil 15, so that the throttling effect of the control edge 50 and the pressure ratios at the consumer connection 38 can be regulated specifically with respect to the application. A decisive factor for a characteristic line of the described pressure regulating valve 10 which is continuous also in low pressure ranges is that the ratio between the surface A1 of the first seat valve 45 on the inlet side, which surface A1 is acted upon by pressure, and the corresponding surface A2 of the second valve seat 49 is less than 0.3. The deflecting movement imparted to the armature 17 and actuating element 35 is reset in the currentless state of the coil 15 by the hydraulic pressure in the inlet 36.

Figure 2:
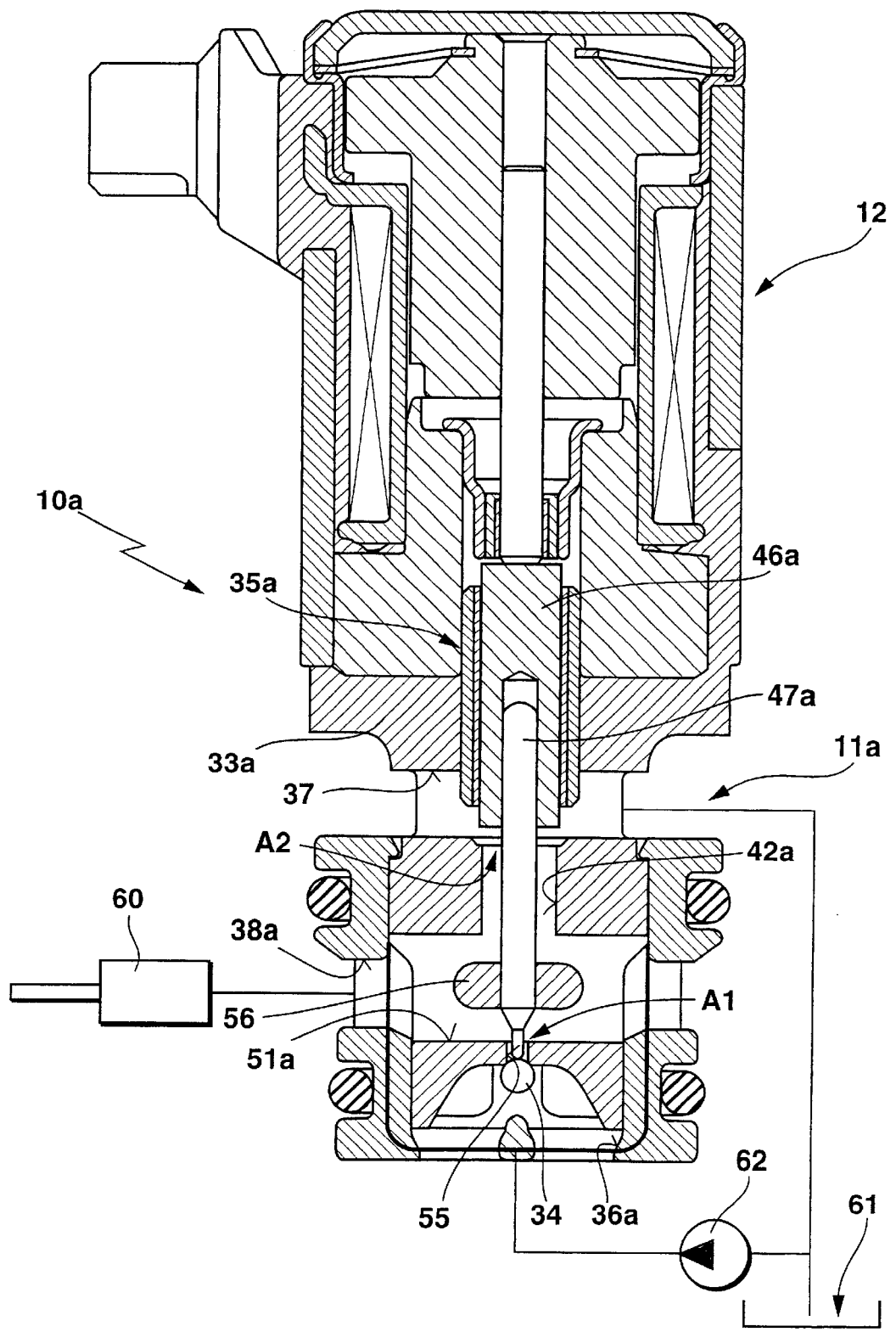

The second embodiment example of a pressure regulating valve 10a shown in FIG. 2 differs from the first embodiment example in that the construction of the valve part 11 is modified. Modified structural component parts of the second embodiment example are identified in the following by the addition of an 'a', while the reference numbers for identical structural component parts are the same as those used in FIG. 1.

One of the differences in the valve part 11a consists in that the positions of the inlet 36a and consumer channel 38a have been reversed. Accordingly, the inlet 36a coupled with a pressure generator 62 is now located at the front end of the valve part 11a, while the consumer channel 38a connected with a hydraulic consumer 60 is constructed as an annular channel which opens into a transverse bore hole 51a. The arrangement of the return 37 connected with a tank 61 remains unaltered on the side of the valve part 11a facing the magnet part 12. A connection between the inlet 36a and the consumer channel 38a is carried out by means of an axial bore hole 55. This axial bore hole 55 is closed by the closing element 34 in the currentless state of the magnet part 12 shown in the Figure. In this state, there is no throttling of the pressure medium connection between the return 37 and the consumer channel 38a. The actuation of the closing element 34 is carried out in a manner identical to that in the first embodiment example by means of the actuating element 35a which penetrates the control bore hole 42a but which is constructed in two parts in the second embodiment example and is formed of a shaft 46a and a tappet 47a which is pressed into the latter. In order to improve guidance and centering of the actuating element 35a, an eyelet-like projection 56 projects into the transverse bore hole 51a. This eyelet-like projection 56 guides the tappet 47a of the actuating element 35a and is connected with the connection piece 33a in a manner that is not shown in the drawing. The projection 56 is arranged centrically with respect to the transverse bore hole 51a and pressure medium flows around it on all sides. In the opened state of the closing element 34, the axial bore hole 55 acts as a throttle for the pressure generator 62 coupled with the inlet 36a, so that an externally arranged throttle for the pressure generator 62 can be omitted. The second embodiment example makes do without a bypass 52, which is burdensome to manufacture due to the fact that it extends diagonally in the valve part 11, and makes it possible to construct a second guidance location for the actuating element 35a in the form of the projection 56. Further, the throttle 63 for the pressure generator 62 on the inlet side is integrated in the pressure regulating valve 10 and the connections of the pressure regulating valve 10a are situated more favorably with respect to the conditions under which they are used by the customer.

Of course, it is possible to modify or add to the embodiment examples in other ways without departing from the basic ideas of the invention. In this respect, it is noteworthy that the pressure regulating valve 10, in addition to its construction, described above, as an opener, i.e., supplying current to the coil 15 causes the closing element 34 to open, can also be constructed as a closer. In contrast to the described magnet part 12, the arrangement of coil core 16 and armature 17 is essentially reversed in the case of closers. Accordingly, when current is supplied to the coil 15, the armature 17 is moved against the force of a pressure spring in such a way that the closing element 34 moves into its closed position.

What is claimed is:

1. Electromagnetic pressure regulating valve (10, 10a) with a magnet part (12) comprising at least one electrically controllable coil (15), a coil core (16) and an armature (17) which is guided so as to be displaceable, with a valve part (11, 11a) having an inlet (36, 36a), a return (37), a consumer connection (38, 38a), and a valve element (34, 35, 35a) cooperating with the armature (17), that the valve part (11, 11a) having a first seat valve (45) with a closing element (34) and an actuating element (35, 35a) which is switched between the armature (17) and the closing element (34), the actuating element (35, 35a) penetrating a control bore hole (42, 42a) of the valve part (11, 11a) and having a control edge (50) which forms a second seat valve (49) in cooperation with the valve bore hole (42), the ratio formed between the hydraulically active pressure surface (A1) of the first seat valve (45) and the hydraulically active pressure surface (A2) of the second seat valve (49) being less than 0.3, and the magnet part (12) forming a plunger stage in the form of an armature (17) which penetrates at least partially into the coil core (16).

2. Electromagnetic pressure regulating valve (10, 10a) according to claim 1, wherein the actuating element (35, 35a) has a shaft (46, 46a) and a tappet (47, 47a), the control edge (50) of the actuating element (35, 35a) is formed at the transition from the shaft (46, 46a) to the tappet (47, 47a), and in that the control edge (50) has no throttling action in the opened end position of the second seat valve (49).

3. Electromagnetic pressure regulating valve (10, 10a) according to claim 1, wherein the actuating element (35, 35a) lifts the closing element (34) from its seat in the regulating position of the pressure regulating valve (10), and the control edge (50) of the actuating element (35, 35a) throttles the flow of pressure medium from the inlet (36, 36a) to the return (37) in this regulating position.

4. Electromagnetic pressure regulating valve (10, 10a) according to claim 1, wherein the first seat valve (45) is arranged in the inlet (36, 36a) of the valve part (11, 11a).

5. Electromagnetic pressure regulating valve (10) according to claims 1, wherein the consumer channel (38) is arranged at an end of the valve part (11) which faces away from the magnet part (12) and is connected with the return (37) via a bypass (52) to the inlet (36), and the bypass (52) opens into the control borehole (42) in the area in front of the control edge (50) in the flow direction of the pressure medium.

6. Electromagnetic pressure regulating value (10) according to claim 5, wherein the inlet (36) and the return (37) branch off laterally from the control borehole (42).

7. Electromagnetic pressure regulating valve (10a) according to claim 1, wherein the inlet (36a) is arranged at the front end of the valve part (11a), and the consumer channel (38a) and the return (37) branch off laterally from the control borehole (42a).

8. Electromagnetic pressure regulating valve (10a) according to claim 7, wherein the inlet (36a) and the control bore hole (42a) open into a tansverse bore hole (51a) which passes into the working connection (38a) and a projection (56) is formed in this transverse bore hole (51a), wherein pressure medium flows around this projection (56) on all sides and the projection (56) forms a guide for the actuating element (35a).

* * * * *